United States Patent
Zhang et al.

(10) Patent No.: US 11,441,353 B2
(45) Date of Patent: Sep. 13, 2022

(54) BEAM-STEERING SYSTEM BASED ON A MEMS-ACTUATED VERTICAL-COUPLER ARRAY

(71) Applicant: The Regents of the University of California, Oakland, CA (US)

(72) Inventors: Xiaosheng Zhang, Berkeley, CA (US); Ming Chiang A Wu, Moraga, CA (US); Andrew S Michaels, Berkeley, CA (US); Johannes Henriksson, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/252,671

(22) PCT Filed: Jun. 19, 2019

(86) PCT No.: PCT/US2019/037973
§ 371 (c)(1),
(2) Date: Dec. 15, 2020

(87) PCT Pub. No.: WO2020/040854
PCT Pub. Date: Feb. 27, 2020

(65) Prior Publication Data
US 2021/0116778 A1    Apr. 22, 2021

Related U.S. Application Data

(60) Provisional application No. 62/686,848, filed on Jun. 19, 2018.

(51) Int. Cl.
*G02F 1/29*       (2006.01)
*G02F 1/313*      (2006.01)
(Continued)

(52) U.S. Cl.
CPC ............ *E06B 9/80* (2013.01); *E06B 9/325* (2013.01); *E06B 9/326* (2013.01); *E06B 9/34* (2013.01);
(Continued)

(58) Field of Classification Search
CPC ..... G02F 1/3135; G02B 6/351; G02B 6/3524; G02B 6/3536; G02B 6/3534
See application file for complete search history.

(56) References Cited

U.S. PATENT DOCUMENTS 5,543,805 A     8/1996   Thaniyavarn
5,761,352 A *   6/1998   Kitajima ............... G02B 6/3508
                                                           385/16
(Continued)

FOREIGN PATENT DOCUMENTS

EP       3635460 A1     4/2020
JP       2018-049223 A  3/2018
(Continued)

OTHER PUBLICATIONS

Authorized Officer: Lee Young, International Search Report and Written Opinion issued in counterpart PCT application No. PCT/US2019/037973, dated Feb. 21, 2020, 12 pp.

(Continued)

*Primary Examiner* — Rhonda S Peace
(74) *Attorney, Agent, or Firm* — Kaplan Breyer Schwarz, LLP

(57) ABSTRACT

An integrated-optics MEMS-actuated beam-steering system is disclosed, wherein the beam-steering system includes a lens and a programmable vertical coupler array having a switching network and an array of vertical couplers, where the switching network can energize of the vertical couplers such that it efficiently emits the light into free-space. The lens collimates the light received from the energized vertical (Continued)

coupler and directs the output beam along a propagation direction determined by the position of the energized vertical coupler within the vertical-coupler array. In some embodiments, the vertical coupler is configured to correct an aberration of the lens. In some embodiments, more than one vertical coupler can be energized to enable steering of multiple output beams. In some embodiments, the switching network is non-blocking.

30 Claims, 13 Drawing Sheets

(51) Int. Cl.
  *E06B 9/80* (2006.01)
  *E06B 9/34* (2006.01)
  *E06B 9/326* (2006.01)
  *E06B 9/42* (2006.01)
  *E06B 9/325* (2006.01)
(52) U.S. Cl.
  CPC ............... *E06B 9/42* (2013.01); *G02F 1/292* (2013.01); *G02F 1/3132* (2013.01); *G02F 1/3137* (2013.01)

(56) References Cited

U.S. PATENT DOCUMENTS

| | | | | |
|---|---|---|---|---|
| 6,842,563 | B2* | 1/2005 | Zhang | G02B 6/3508 385/24 |
| 6,944,361 | B2* | 9/2005 | Xue | G02B 6/3508 385/39 |
| 10,466,423 | B2* | 11/2019 | Spector | G02B 6/354 |
| 10,473,862 | B2* | 11/2019 | Spector | B81B 3/0083 |
| 2002/0186918 | A1 | 12/2002 | Burroughs | |
| 2002/0186919 | A1 | 12/2002 | Pepper | |
| 2003/0107793 | A1 | 6/2003 | Capps | |
| 2003/0198259 | A1* | 10/2003 | Zhang | G02B 6/125 372/20 |
| 2003/0231821 | A1 | 12/2003 | Clarke et al. | |
| 2014/0347733 | A1 | 11/2014 | Stewart et al. | |
| 2016/0170287 | A1 | 6/2016 | Bitauld et al. | |
| 2016/0327751 | A1 | 11/2016 | Wu et al. | |
| 2018/0088439 | A1 | 3/2018 | Inoue et al. | |
| 2021/0116778 | A1* | 4/2021 | Zhang | E06B 9/325 |

FOREIGN PATENT DOCUMENTS

| | | |
|---|---|---|
| JP | 2019-537068 A | 12/2019 |
| WO | 2018/049345 A2 | 3/2018 |
| WO | 2018/111316 A1 | 6/2018 |
| WO | 2018/227007 A1 | 12/2018 |

OTHER PUBLICATIONS

Daisuke Inoue et al., "An optical scanner based on beam switching method fabricated on silicon photonics circuit", "Proceedings of SPIE", Laser Radar Technology and Application XXIII, Event: SPIE Defense + Security, 2018, Orlando, Florida, US, May 10, 2018, doi: 10.1117/12.2309304, 7 pp., vol. 10636, https://www.SPIEDigitalLibrary.org/conference-proceedings-of-spie.

Tae Joon Seok et al., "Large-scale broadband digital silicon photonic switches with vertical adiabatic couplers", "Optica", Jan. 13, 2016, Optical Society of America, pp. 64-70, vol. 3, No. 1, http://dx.doi.org/10.1364/OPTICA.3.000064.

Office Action issued in Japanese patent application No. 2020-570783, dated Apr. 4, 2022, 15 pp. w/ translation.

Extended European Search Report issued in EP patent application No. 19852892.9, dated Mar. 11, 2022, 9 pp.

Jie Sun et al., "Large-Scale Silicon Photonic Circuits for Optical Phased Arrays", IEEE Journal of Selected Topics in Quantum Electronics, Jul. 1, 2014, doi: 10.1109/JSTQE..2013..2293316, 15 pp., vol. 20, No. 4.

* cited by examiner

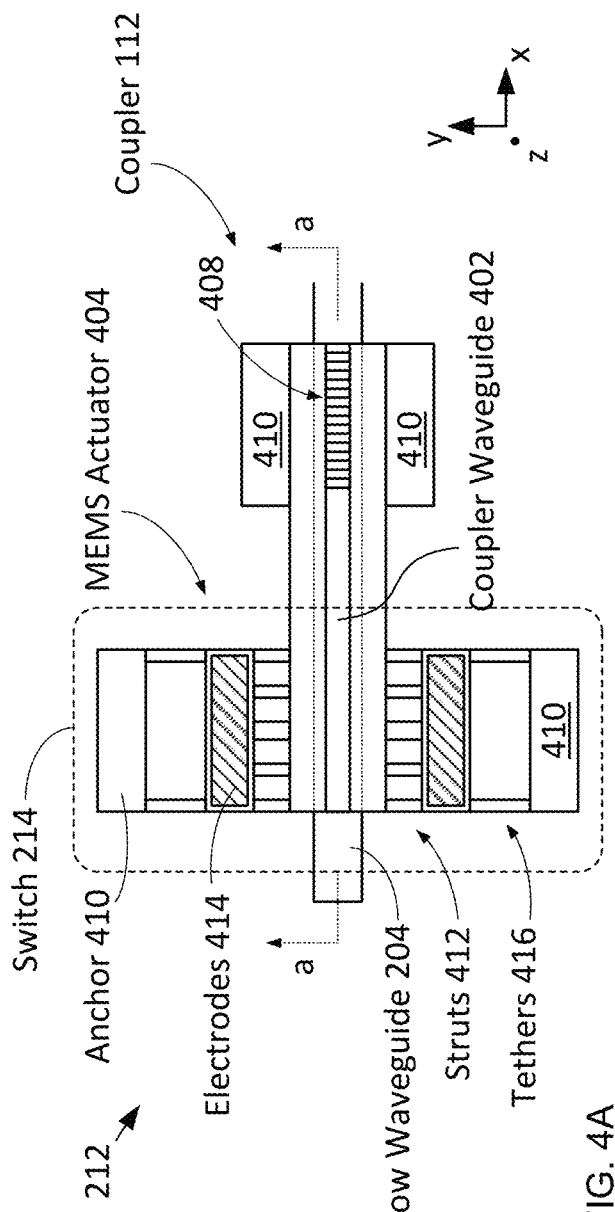
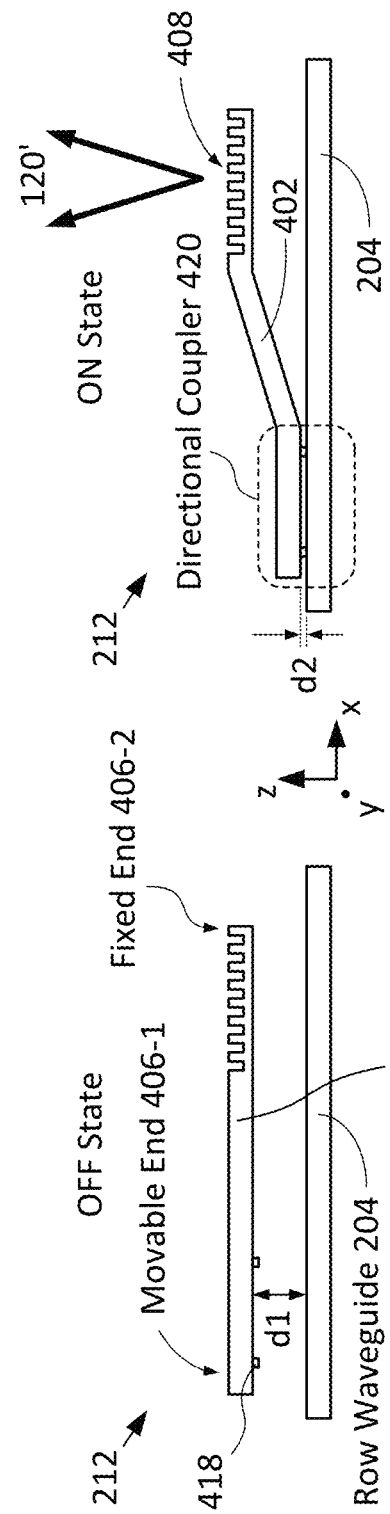
FIG. 4A
FIG. 4B
FIG. 4C

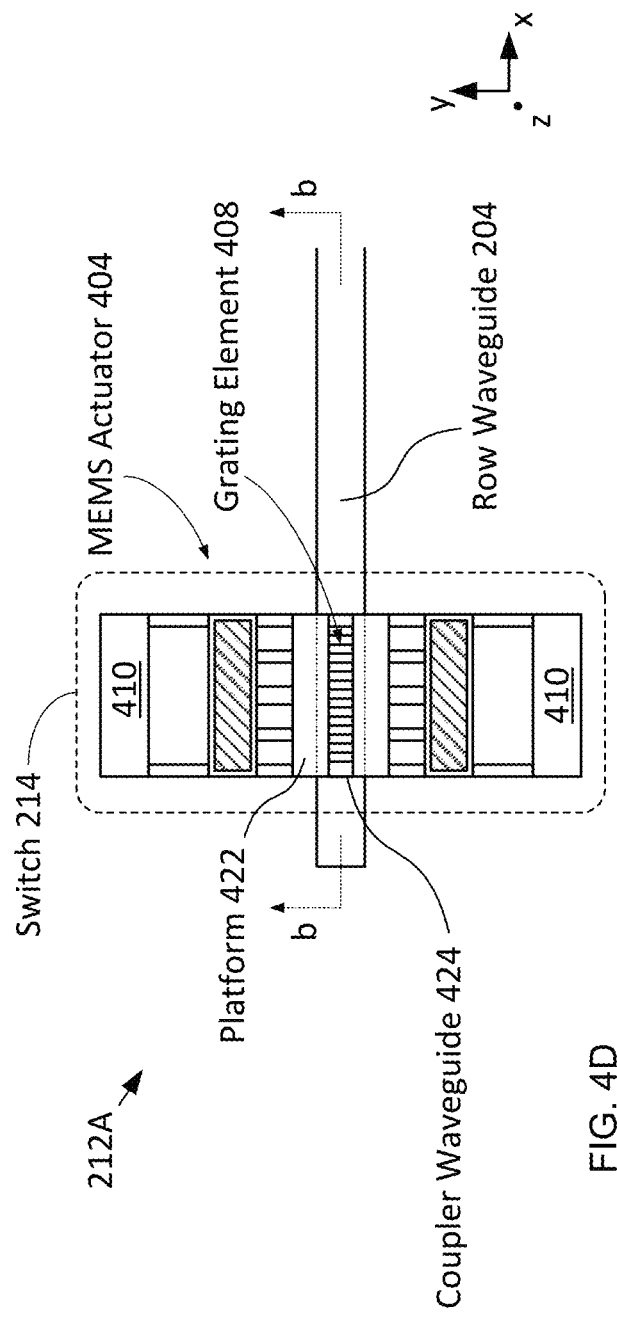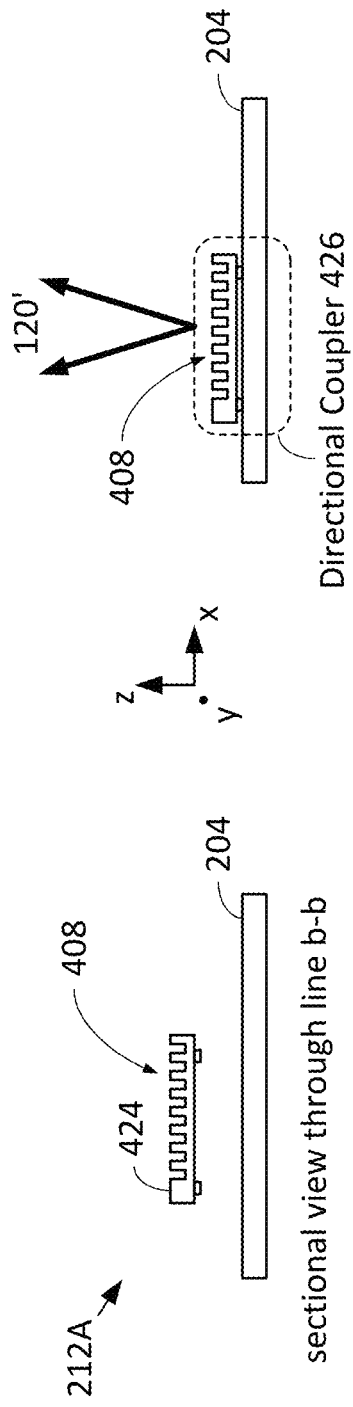

BEAM-STEERING SYSTEM BASED ON A MEMS-ACTUATED VERTICAL-COUPLER ARRAY

CROSS REFERENCE TO RELATED APPLICATION

This case claims the benefit of U.S. Provisional Patent Application Ser. No. 62/686,848 filed on Jun. 19, 2018, which is incorporated herein by reference.

If there are any contradictions or inconsistencies in language between this application and the cases that have been incorporated by reference that might affect the interpretation of the claims in this case, the claims in this case should be interpreted to be consistent with the language in this case.

STATEMENT REGARDING FEDERALLY SPONSORED RESEARCH

This invention was made with Government support under Contract No. DE-AR0000849 awarded by the Advanced Research Projects Agency-Energy (ARPA-E) and Contract No. EEC0812072 awarded by the National Science Foundation (NSF). The Government has certain rights in the invention.

TECHNICAL FIELD

The present disclosure relates to free-space optics in general, and, more particularly, to free-space beam-steering.

BACKGROUND

Agile beam-steering devices are needed for free-space optical communications as well as LiDAR (light detection and ranging), 3D imaging, sensing, and microscopy applications. They provide scanning and acquisition/pointing/tracking (ATP) functions. Traditional beam-steering apparatuses use motorized mechanical gimbals to rotate the entire optical systems. Unfortunately, motorized gimbals are bulky, heavy, and consume a great deal of power.

Integrated beam-steering systems have shown great utility in portable or mobile platforms, and have become key elements of "solid-state LiDAR". For example, collimation and beam-steering has been demonstrated in the prior art using a light source positioned at the focal plane of a lens (e.g., telecentric lens, telescope, etc.) and changing the arrangement of the position of the optical axis of the lens and the position of the light source within the focal plane of the lens. This has been done in various ways, such as by moving a macro light source relative to the optical axis, moving an optical fiber located in the focal plane, and moving the lens relative to a fixed-position light source.

Unfortunately, the mechanical systems required to move the lens and/or light source have limited frequency response due to the weight/stiffness of the loads, are too slow for LiDAR and/or free-space communications between fast moving vehicles, and are bulky, complex, slow, and expensive.

Other prior-art beam-steering systems are based on electronic crossbar switches that selectively energize individual elements of a two-dimensional (2D) array of vertical cavity surface-emitting lasers (VCSEL). However, such an approach requires large arrays of lasers. In addition, such systems require VCSEL sources, which are not well suited for some communication or sensing applications.

Still other prior-art beam-steering systems have used silicon-photonic-based thermo-optic switches to activate surface-emitting grating couplers. Unfortunately, thermo-optic switches are temperature sensitive, have limited steering capability, have high power consumption and do not scale well to large-scale beam-steering devices.

Practical beam-steering technology remain, as yet, unavailable in the prior art.

SUMMARY

The present disclosure is directed to a beam-steering apparatus comprising an integrated-optics-based, programmable, two-dimensional (2D) array of mechanically active vertical-grating couplers (i.e., couplers) that is located in the focal plane of a lens. The lens is arranged to convert free-space light emitted by any of the couplers into a collimated, free-space light beam. The programmable coupler array is monolithically integrated on a substrate and includes a switching network that controls which coupler (or couplers) is energized (i.e., receives light and launches it into free space). The switching network is configured to mitigate leakage to non-energized couplers, thereby mitigating optical crosstalk. The propagation direction of each free-space light beam (i.e., its output angle with respect to the optical axis of the lens) is a function of the x and y coordinates of its respective coupler relative to the optical axis of the lens. Embodiments in accordance with the present disclosure are particularly well suited for use in LiDAR systems, optical communications systems, optical coherence tomography and other medical imaging systems, three-dimensional imaging and sensing applications, and the like.

An illustrative embodiment in accordance with the present disclosure is a beam-steering system that includes a lens and a programmable vertical coupler array that includes (1) a 2D array of mechanically active integrated-optics-based couplers and (2) an integrated-optics-based switching network for controlling which coupler is energized.

Each vertical coupler of the 2D array includes a grating structure formed in an integrated-optics waveguide, where the waveguide and grating are configured such that the optical energy of a light signal propagating through the waveguide is launched into free space by the grating.

The switching network receives a light signal at an input port of a bus waveguide that is optically couplable with each of a plurality of row waveguides via a different MEMS-based optical switch that has an OFF state and an ON state. In its OFF state, a light signal received at the switch remains in the bus waveguide and passes through the switch with substantially no optical energy being lost. In its ON state, the light signal is completely transferred from the bus waveguide to its respective row waveguide. Each switch is configured such that the bus and row waveguides are optically isolated from one another when the switch is in its OFF state to mitigate leakage between them at the switch.

Each row waveguide is also optically couplable with each coupler in a corresponding row of the coupler array by another MEMS-based optical switch. In the OFF state of each row-waveguide switch, a light signal propagating through the row waveguide remains in the row waveguide and passes through the switch with substantially no optical energy being lost. In its ON state, the light signal is completely transferred from the row waveguide to its respective coupler.

The lens is arranged to receive the optical energy launched into free-space by each coupler and convert the received optical energy into a collimated free-space output beam. The output beam is directed along a propagation direction that is based on the x and y coordinates of the vertical coupler relative to the optical axis of the lens.

In some embodiments, only a single vertical coupler can be energized at a time. In some embodiments, the switching network enables a plurality of vertical couplers to be energized at a given time. In some embodiments, the switching network is completely non-blocking, thereby enabling each vertical coupler to be energized regardless of the state of any other vertical coupler.

In some embodiments the arrangement of the lens and coupler array is controllable.

An embodiment in accordance with the present disclosure is a beam-steering system (100) comprising: a lens (102) having an optical axis (A1) and a focal plane (FP1); and a programmable vertical coupler array (104) comprising: a substrate (114); an array of couplers (112) that is a two-dimensional array characterized by a center point (CP1) and having a plurality of coupler rows (CR) and a plurality of coupler columns (CC), each coupler of the array thereof including a coupler waveguide (402) and a vertical-coupling element (408) that is configured to launch optical energy received from the coupler waveguide into free space; a bus waveguide (202) disposed on the substrate, the bus waveguide having a first input port (IP1) for receiving a first light signal (120); a plurality of row waveguides (204) disposed on the substrate; and a switching network (110) that is operative for controlling the propagation of a first light signal (120) from the first input port to any coupler of the array thereof; wherein the lens and programmable vertical coupler array are arranged such that the lens receives the optical energy launched by each vertical-coupling element of the plurality thereof and directs the optical energy an output axis that is based on the position of that vertical-coupling element within the programmable vertical coupler array and a first relative position of the lens and the programmable vertical coupler array in at least one dimension.

Another embodiment in accordance with the present disclosure is a method for steering an optical beam, the method comprising: (1) providing a lens (102) having an optical axis (A1) and a focal plane (FP1); (2) locating a programmable vertical coupler array (104), the programmable vertical coupler array comprising: an array of couplers (112) disposed on a substrate (114), the array of couplers being arranged in a two-dimensional array characterized by a center point (CP1) and having a plurality of coupler rows (CR) and a plurality of coupler columns (CC), each coupler of the array thereof including a coupler waveguide (402) and a vertical-coupling element (408) that is configured to launch optical energy received from the coupler waveguide into free space; a bus waveguide (202) disposed on the substrate, the bus waveguide having a first input port (IP1); a plurality of row waveguides (204) disposed on the substrate; and a switching network (110) that is operative for controlling the propagation of a first light signal (120) from the first input port to any coupler of the array thereof; (3) arranging the lens and programmable vertical coupler array such that the lens receives the optical energy launched by each vertical-coupling element of the plurality thereof and directs the optical energy an output axis that is based on the position of that vertical-coupling element within the programmable vertical coupler array and a first relative position of the lens and the programmable vertical coupler array in at least one dimension; (4) controlling the switching network to direct a first light signal from the input port to a first coupler of the array thereof such that the first coupler provides a second light signal (120') based on the first light signal to the lens, the first coupler being located at a first position (x1,y1); and (5) collimating the second light signal and directing it along an output axis (A2) that is based on the first position.

BRIEF DESCRIPTION OF THE DRAWINGS

FIG. 4A depicts a schematic drawing of a top view of an exemplary MEMS-controlled vertical coupler in accordance with the illustrative embodiment.

FIGS. 4B-C depict schematic drawings of a sectional view of MEMS-controlled vertical coupler 212 in its "off" and ON states, respectively.

FIG. 4D depicts a schematic drawing of a top view of an alternative embodiment of a MEMS-controlled vertical coupler in accordance with the present disclosure.

FIGS. 4E-F depict schematic drawings of MEMS-controlled vertical coupler 212A in its "off" and ON states, respectively.

DETAILED DESCRIPTION

Figure 1A:
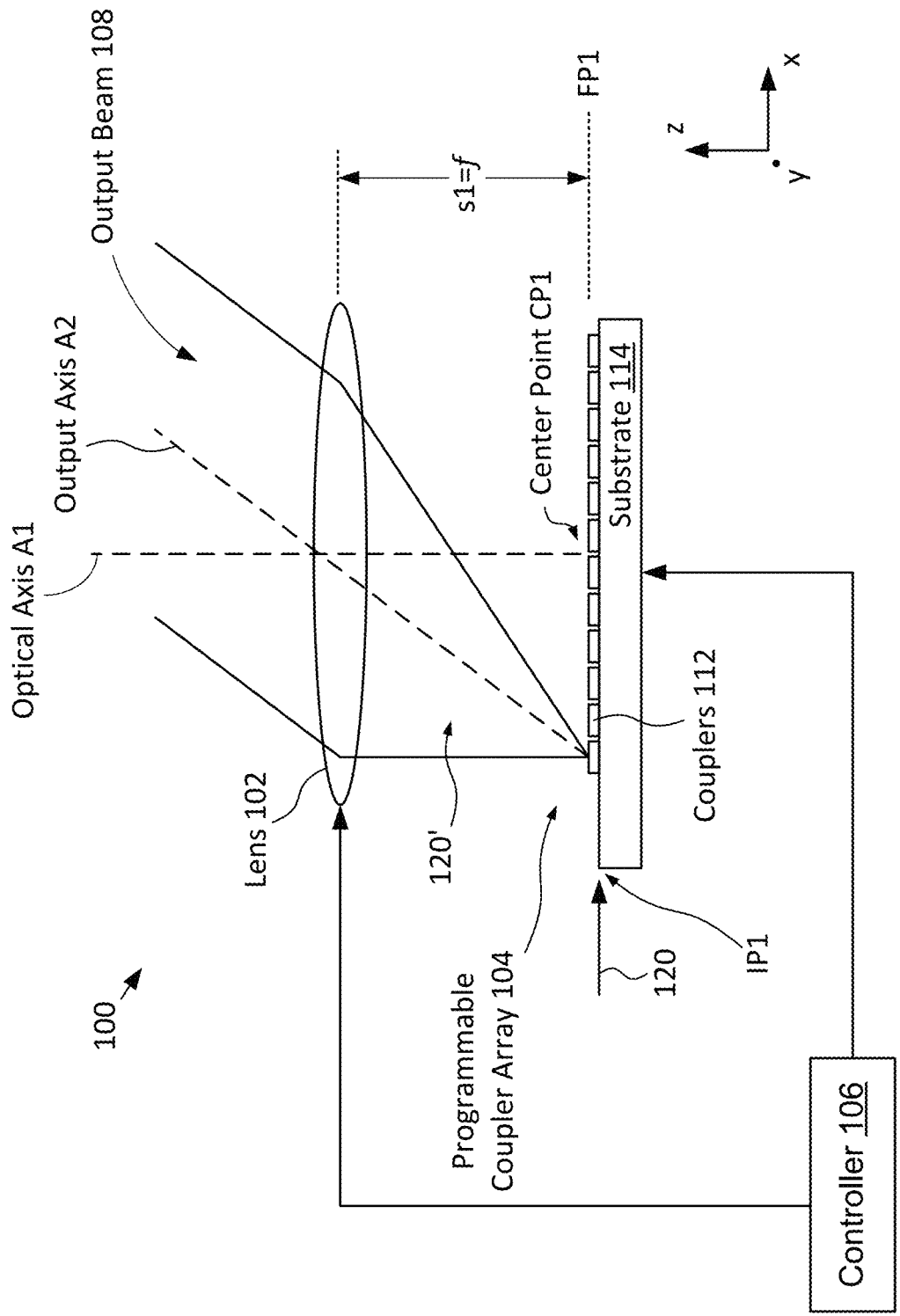
FIGS. 1A-B depict schematic drawings of side and top views of an illustrative embodiment of a beam-steering system in accordance with the present disclosure.
Figure 1B:
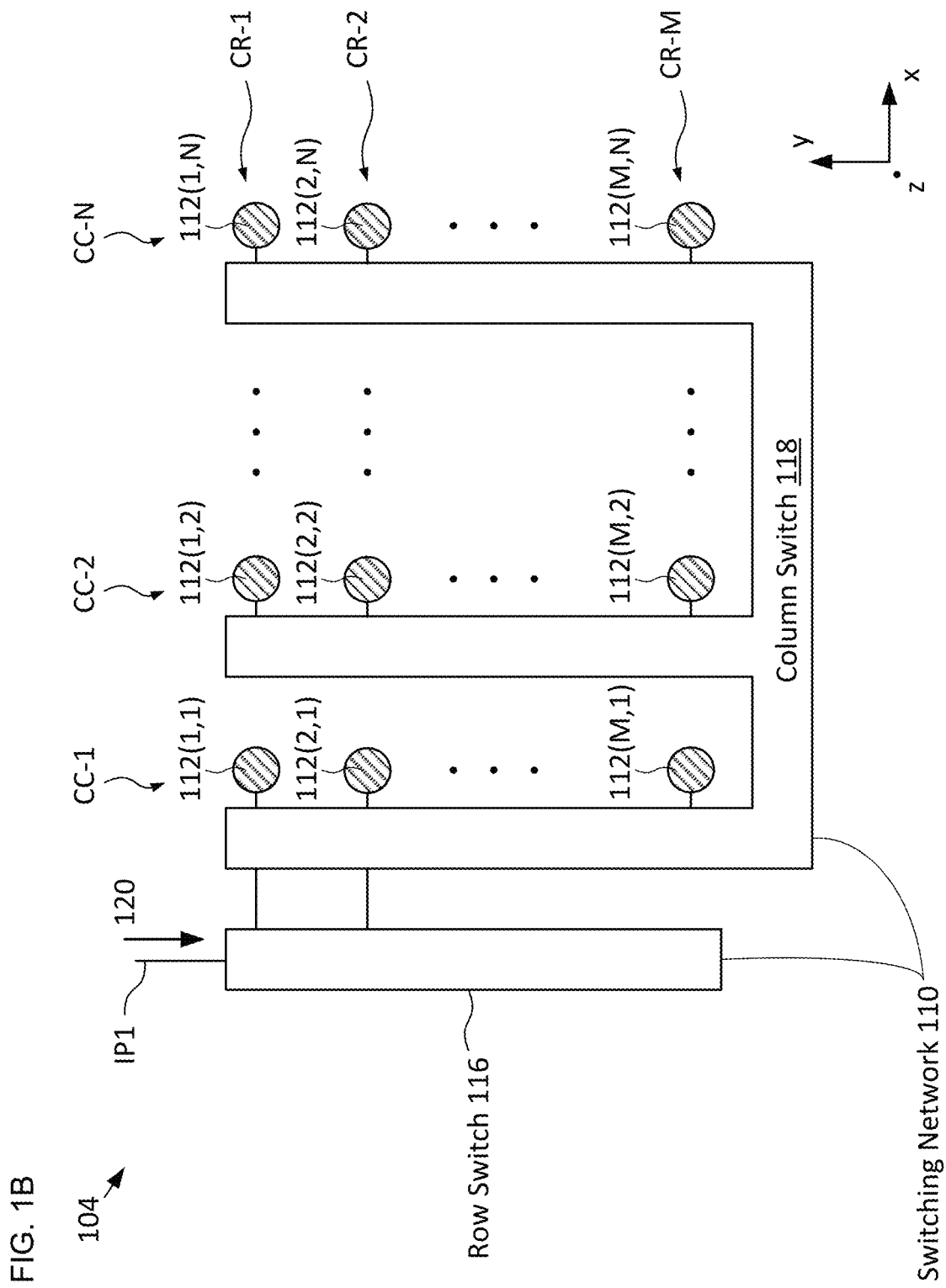

FIGS. 1A-B depict schematic drawings of side and top views of an illustrative embodiment of a beam-steering system in accordance with the present disclosure. Beam-steering system 100 includes lens 102, programmable coupler array 104, and controller 106. System 100 is configured to receive input light signal 120, collimate its optical energy as free-space output beam 108, and steer the output beam through a three-dimensional volume. In the depicted example, light signal 120 is a continuous wave (CW) signal; however, system 100 is operative for virtually any light signal (e.g., frequency-modulated continuous wave (FMCW) signals, LiDAR signals, light pulses, and the like).

Lens 102 is a simple convex-convex refractive lens having optical axis A1 and focal length, f, which defines focal plane FP1. In some embodiments, lens 102 is a different type of lens, such as a compound lens (e.g., a telecentric lens, etc.) or other multi-element lens configured to, for example, correct one or more aberrations or otherwise improve optical performance. In some embodiments, lens 102 is a planoconvex lens. In some embodiments, lens 102 is a cellphone lens, which are typically low cost and can enable mobile systems. In some embodiments, lens 102 is a diffractive element, such as a diffractive lens, holographic element, metasurface lens, and the like.

Programmable coupler array 104 (hereinafter referred to as coupler array 104) includes switching network 110 and vertical couplers 112(1,1) through 112(M,N) (referred to, collectively, as couplers 112). Vertical couplers 112 are arranged in a two-dimensional array comprising coupler rows CR-1 through CR-M (referred to, collectively, as coupler rows CR) and coupler columns CC-1 through CC-N (referred to, collectively, as coupler columns CC).

In the depicted example, switching network 110 and couplers 112 are monolithically integrated on substrate 114; however, in some embodiments, one or more elements of programmable coupler array 104 are located on substrate 114 using a different integration method, such as bump bonding, multi-chip module packaging, etc.

In the depicted example, substrate 114 is a silicon substrate. The use of a silicon substrate enables the straightforward inclusion of integrated circuits and/or other circuitry that can augment the capabilities of coupler array 104. In some embodiments, such on-chip capability includes electronics for signal modulation, phase shifting, photodetectors, processing, memory, signal conditioning, pre-amplification, energy scavenging and/or storage, and the like. In some embodiments, the entire electronics functionality of a LiDAR system is monolithically integrated on substrate 114.

Controller 106 is a conventional controller that is configured to control the positions of lens 102 and coupler array 104 in each of the x-, y-, and z-dimensions via a positioning system, such as a high-precision, multi-axis positioning system, voice coils, piezoelectric actuators, MEMS actuators, and the like. Controller 106 is also operative for controlling the state of switching network 110 and, therefore which coupler or couplers of the coupler array are energized. In some embodiments, controller 106 is at least partially integrated on coupler array 104.

It should be noted that, although the present disclosure is directed toward beam steering applications, the teachings disclosed herein are also applicable to steerable receivers (i.e., receivers whose receiving direction is controllable), as well as transceivers that comprise both a beam-steering transmitter and a steerable receiver.

In the depicted example, lens 102 and coupler array 104 are arranged such that they are concentric and the separation, s1, between them is equal to the focal length, f, of lens 102. As a result, the plane of couplers 112 is substantially located at focal plane FP1 and optical axis A1 is centered on the arrangement of couplers 112, thereby defining center point CP1. In some embodiments, lens 102 is located such that the lens and coupler array are separated by a distance other than the focal length of the lens and/or such that optical axis A1 is not centered on the arrangement of couplers 112 of the coupler array.

In the depicted example, controller 106 is optionally configured to scan lens 102 along scan direction SD1 to control the lateral alignment of lens 102 and coupler array 104 in each of the x- and y-dimensions. Such lateral scanning capability enables output beam 108 to be smoothly moved between angles dictated by the fixed positions of each coupler within the coupler array, thereby realizing a greater number of resolvable spots than possible with a fixed-position system. In some embodiments, controller 106 is further configured to control the vertical separation, s1, between the lens and coupler array, thereby enabling output beam 108 to be focused at different points in space. It should be noted that the lateral alignment between the lens and coupler array can be controlled by moving only lens 102, only coupler array 104, or by moving both the lens and coupler array.

Switching network 110 includes row switch 116 and column switch 118, which collectively control the distribution of the optical energy of light signal 120 throughout the programmable coupler array. In the depicted example, switching network 110 is configured to direct all of the optical energy of light signal 120 to only one coupler 112. Switching network 110 is described in more detail below and with respect to FIG. 2.

Each of couplers 112($i,j$), where i=1 through M and j=1 through N, comprises a diffraction grating that is integrated into the structure of an integrated-optics waveguide (i.e., a "coupler waveguide") in coupler array 104 and configured such that its output light signal 120' is characterized by output axis A2, which is substantially aligned with a geometric line between its respective coupler and the center of lens 102. In some embodiments, it is preferable that at least one diffraction grating of couplers 112 is a blazed grating to achieve high efficiency. In addition, in the depicted example, each of couplers 112 is characterized by a large dispersion angle such each of light signals 120' substantially fills the clear aperture of lens 102. It should be noted that the design of each coupler 112 is typically based on its position with coupler array 104.

By virtue of the alignment of output axis A2 with the center of lens 102, light signal 120' illuminates a larger portion of the aperture of the lens, which mitigates the divergence angle of output beam 108 in the far field and increases the resolution with which output beam 108 can be steered.

Each coupler 112($i,j$) is configured such that it can be switched between an ON state and an OFF state. In its ON state, coupler 112($i,j$) is optically coupled with input port IP1 such that its grating structure receives light signal 120 and scatters its optical energy into free space as light signal 120'($i,j$). In its OFF state, coupler 112($i,j$) is optically decoupled from input port IP1 and its grating structure does not receive light signal 120. Preferably, each coupler 112 is designed to correct for aberrations of lens 102. It should be noted that many different designs for the grating element of coupler 112 are within the scope of the present invention, including one-dimensional gratings or two-dimensional gratings.

Lens 102 receives light signal 120'($i,j$) at a distance from optical axis A1 that depends on the position of signal 112($i,j$) within coupler array 104. As a result, every light signal emitted by a different vertical coupler is collimated and steered along a different output axis A2($i,j$) by lens 102.

Figure 1C:
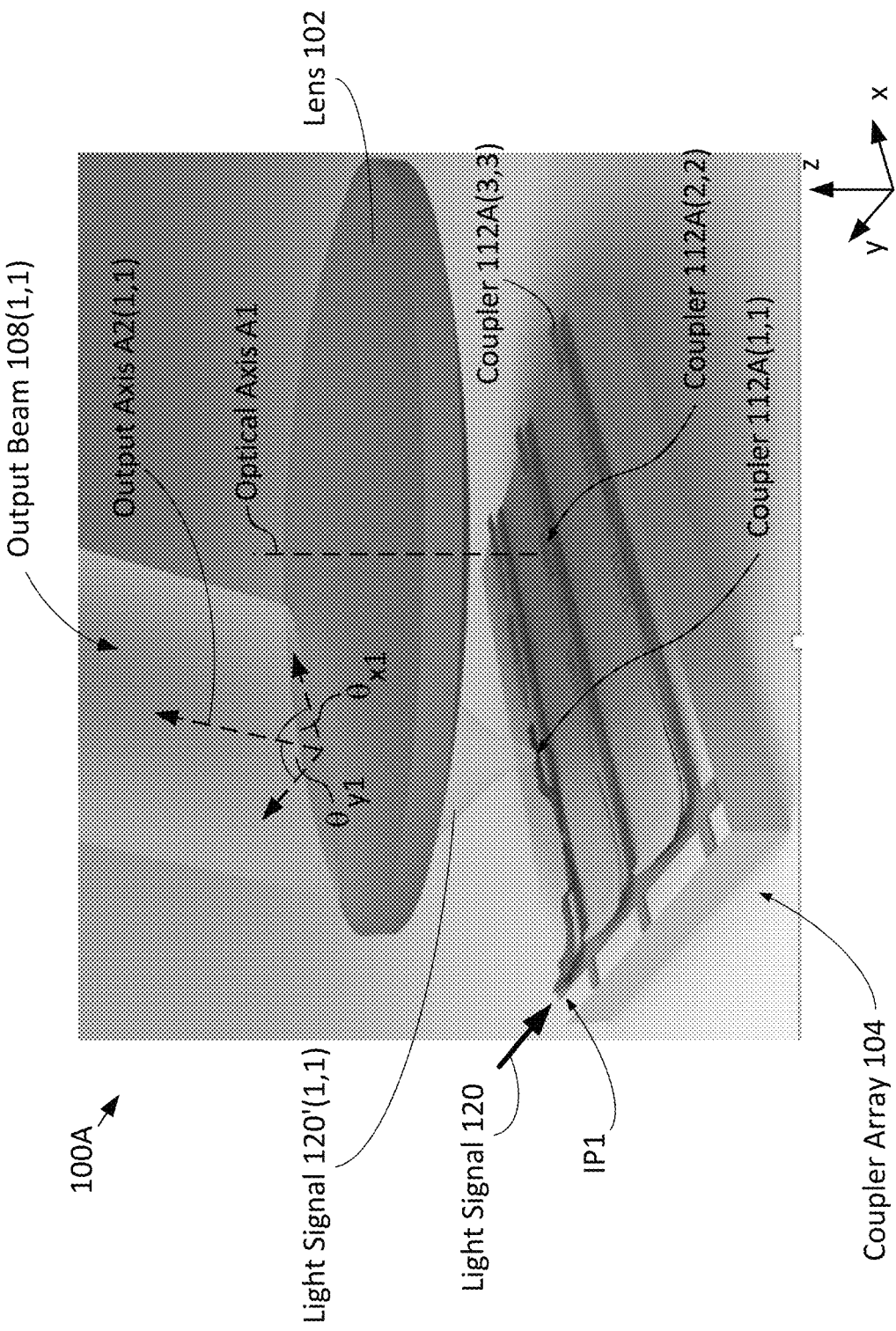
FIGS. 1C-D depict schematic drawings of perspective views of an exemplary beam-steering system in different beam-steering states in accordance with the present disclosure.
Figure 1D:
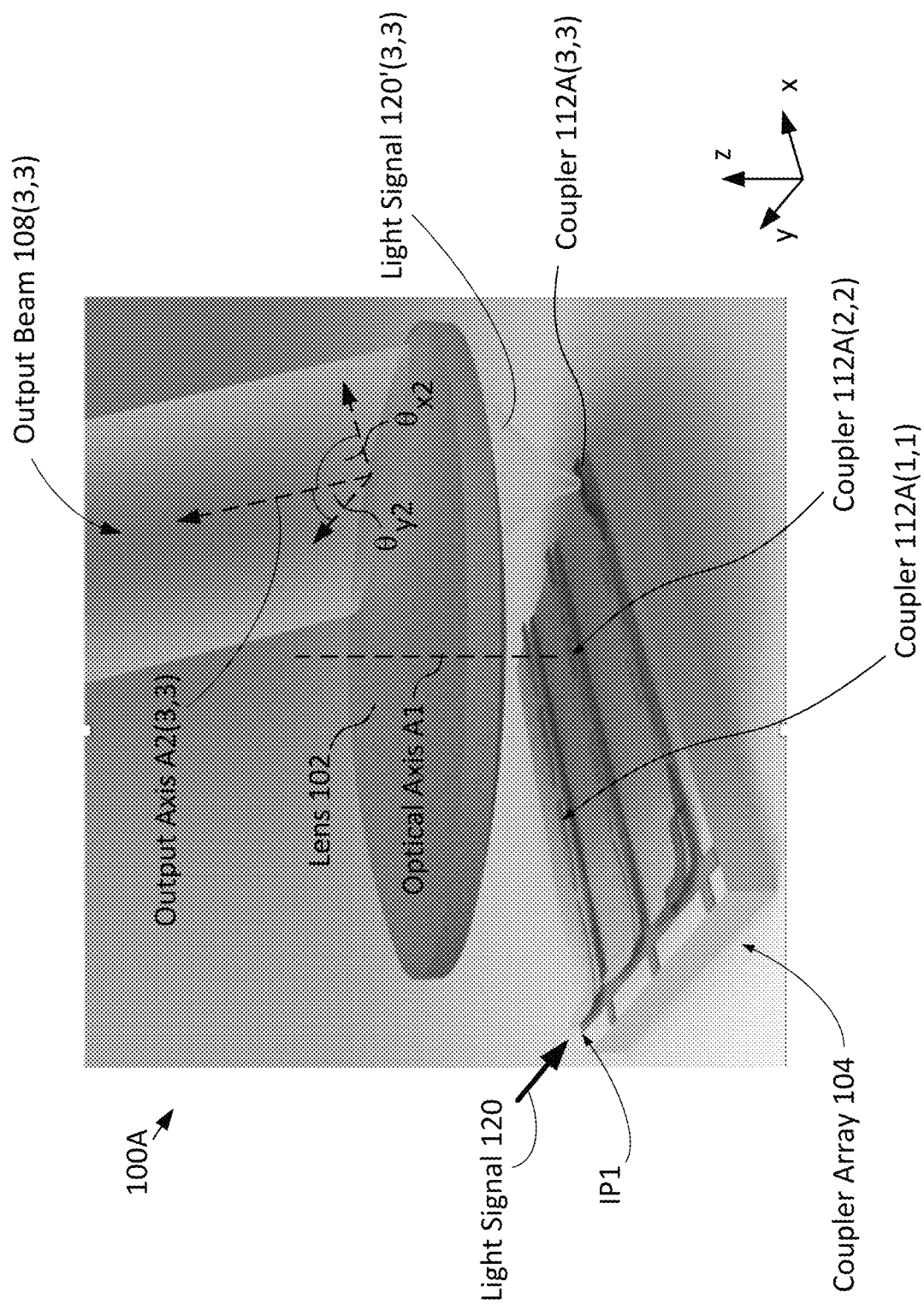

FIGS. 1C-D depict schematic drawings of perspective views of an exemplary beam-steering system in accordance with the present disclosure in different beam-steering states. Beam-steering system 100A is an example of beam steering system 100 in which programmable coupler array 104 includes only nine couplers 112A (i.e., couplers 112A(1,1) through 112A(3,3)), which are arranged in a 3×3 array. Furthermore, it should be noted that, in FIGS. 1C-D, each of couplers 112A(1,1) through 112A(3,3)) is an example of an alternative coupler—specifically, a conventional vertical grating coupler—having an emission pattern that realizes a relatively narrower lights signal propagating along a propagation direction that is substantially normal to the plane of coupler array 104, as discussed below and with respect to FIG. 7.

FIG. 1C shows system 100A in a beam-steering state in which only coupler 112(1,1) is in its ON state. As a result, coupler 112(1,1) receives light signal 120 and launches it into free space as light signal 120'(1,1). Lens 102 receives light signal 120'(1,1), collimates it, and directs it along output axis A2(1,1) as output beam 108(1,1). Output beam 108(1,1) propagates along output axis A2(1,1), which is oriented at angles $\theta_{x1}$ and $\theta_{y1}$. Angles $\theta_{x1}$ and $\theta_{y1}$ are angles in the x-z and y-z planes, respectively, relative to optical axis A1. Angles $\theta_{x1}$ and $\theta_{y1}$ are given by the formulas: $\theta_x = -\tan^{-1}(x/f)$ and $-\theta_y = -\tan^{-1}(y/f)$, where f is the focal length of lens 102 and (x,y) is the coordinate of the energized grating coupler in the x-y plane (i.e., the focal plane of the vertical coupler array) relative to center point CP1.

FIG. 1D shows system 100A in a beam-steering state in which only coupler 112(3,3) is in its ON state. As a result, coupler 112(3,3) receives light signal 120 and launches it into free space as light signal 120'(3,3). Lens 102 receives light signal 120'(3,3), collimates it, and directs it along output axis A2(3,3) as output beam 108(3,3). Output beam 108(3,3) propagates along output axis A2(3,3), which is oriented at angles $\theta_{x2}$ and $\theta_{y2}$.

Figure 2:
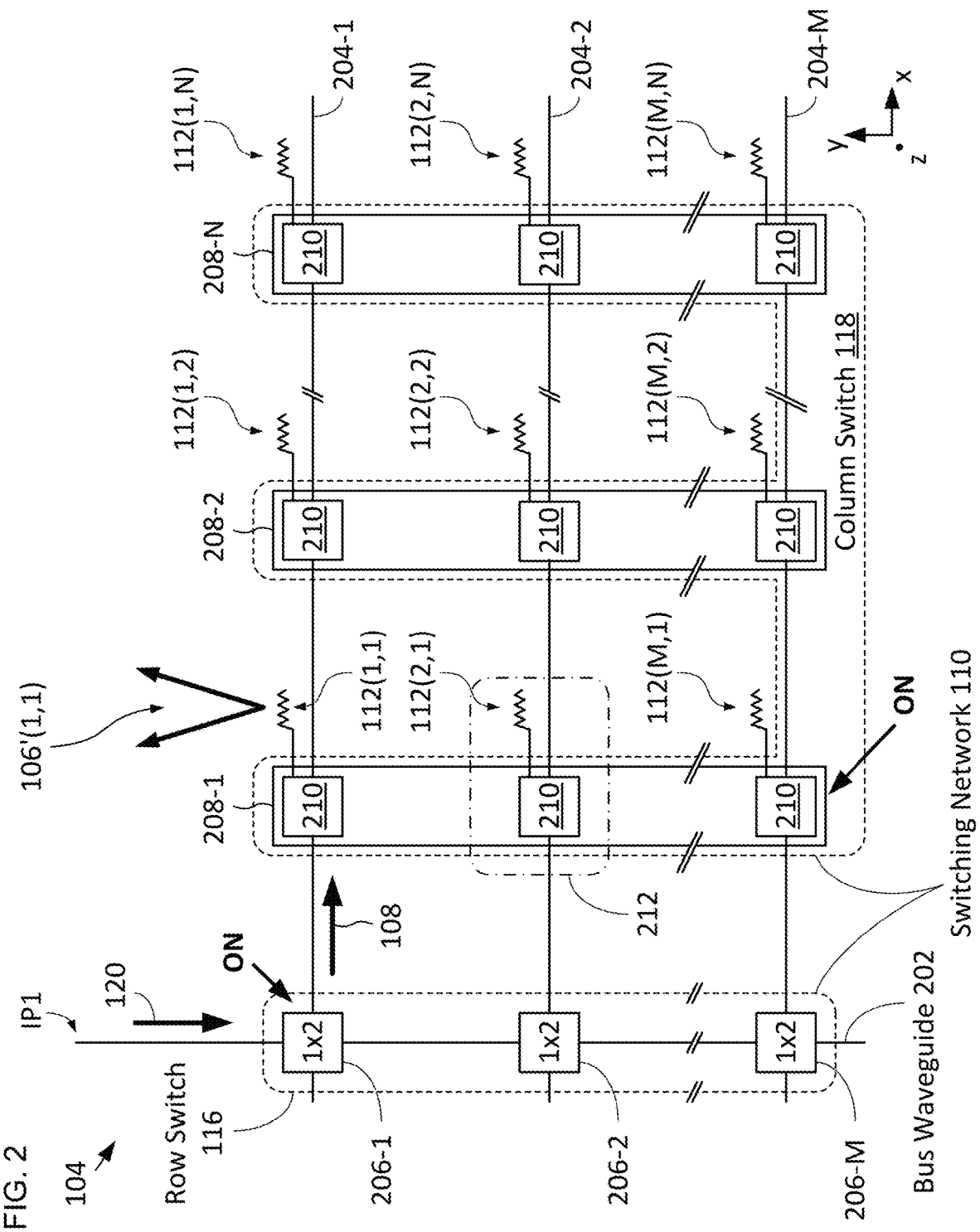
FIG. 2 depicts an operational schematic drawing of a coupler array in accordance with the illustrative embodiment.

FIG. 2 depicts an operational schematic drawing of a coupler array in accordance with the illustrative embodiment. Coupler array 104 includes switching network 110, couplers 112, bus waveguide 202, and row waveguides 204-1 through 204-M.

As depicted in FIG. 2, coupler array 104 in an exemplary switch configuration in which MEMS optical switch 206-1 and column switch array 208-1 are each in their ON states, while all other MEMS optical switches 206 and column switch arrays 208 are in their OFF states (as discussed below). As a result, light signal 120 is diverted from bus waveguide 202 into row waveguide 204-1 by MEMS optical switch 206-1 and then from row waveguide 204-1 into coupler 112(1,1) by column switch array 208-1.

Each of bus waveguide 202 and row waveguides 204-1 through 204-M (referred to, collectively, as row waveguides 204) is a single-mode ridge waveguide having a core of single-crystal silicon. In the depicted example, the bus and row waveguides are coplanar. In some embodiments, at least one of the bus and row waveguides is a multimode waveguide. In some such embodiments, the multi-mode waveguide includes a large width and is configured such that its fundamental mode can be excited to reduce optical loss.

Although the depicted example includes bus and row waveguides (and shunt and coupling waveguides, as discussed below) that are silicon-based ridge waveguides, in some embodiments, a different waveguide structure (e.g., rib waveguides, etc.) and/or a different waveguide material system is used for at least one waveguide. For example, the use of dielectric-based waveguides, such as silicon-nitride-core waveguides, can realize systems having lower optical loss and/or increased optical power-handling capability (peak or average), which can mitigate nonlinear effects, and the like.

Switching network 110 includes row switch 116 and column switch 118.

Row switch 116 is a 1×M switch that includes MEMS optical switches 206-1 through 206-M (referred to, collectively, as MEMS optical switches 206), which are independently controllable 1×2 integrated-optics-based MEMS switches for controlling the optical coupling between bus waveguide 202 and row waveguides 204-1 through 204-M, respectively.

Figure 3A:
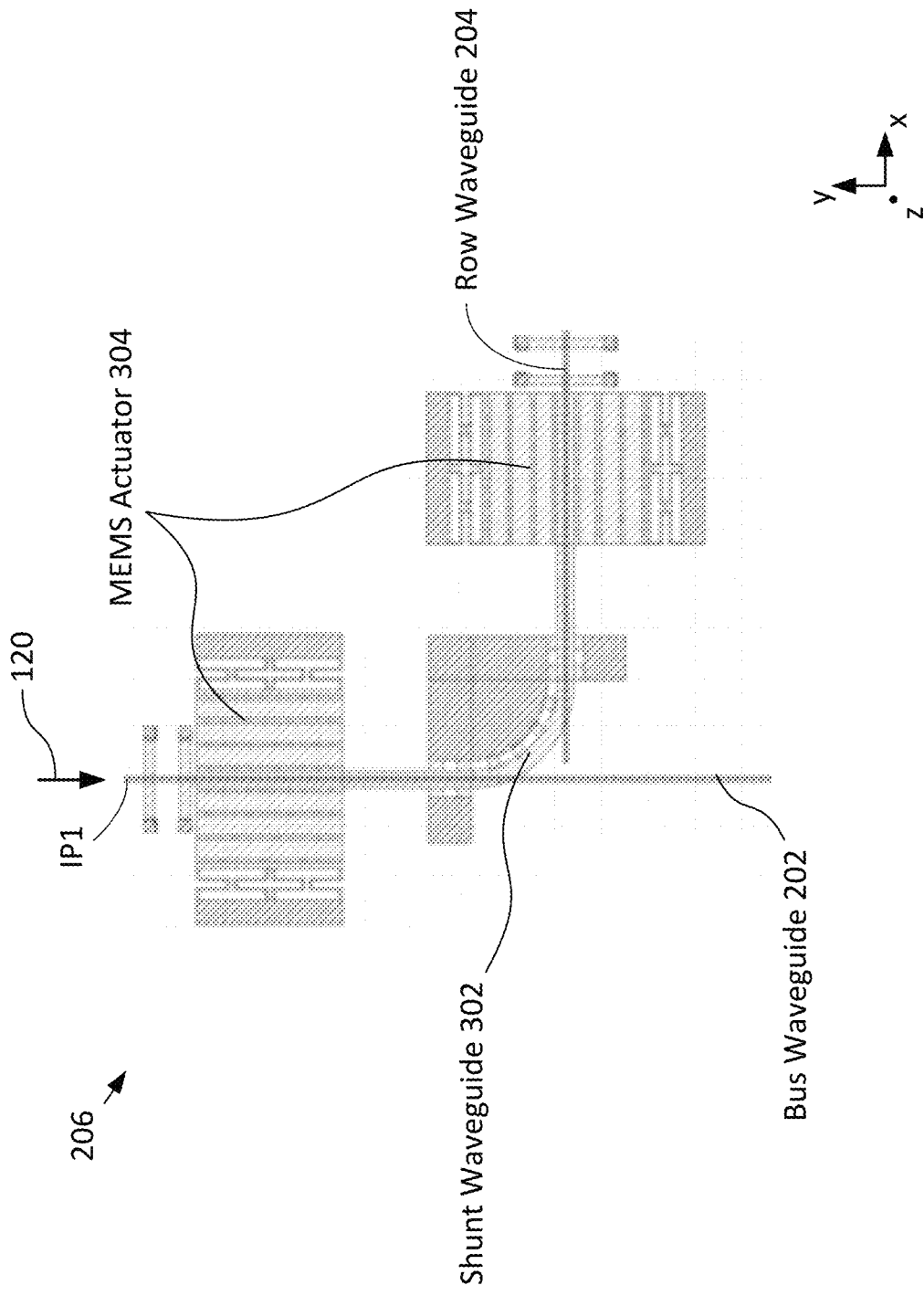
FIG. 3A depicts a schematic drawing of a top view of MEMS optical switch 206.

FIG. 3A depicts a schematic drawing of a top view of MEMS optical switch 206.

Figure 3B:
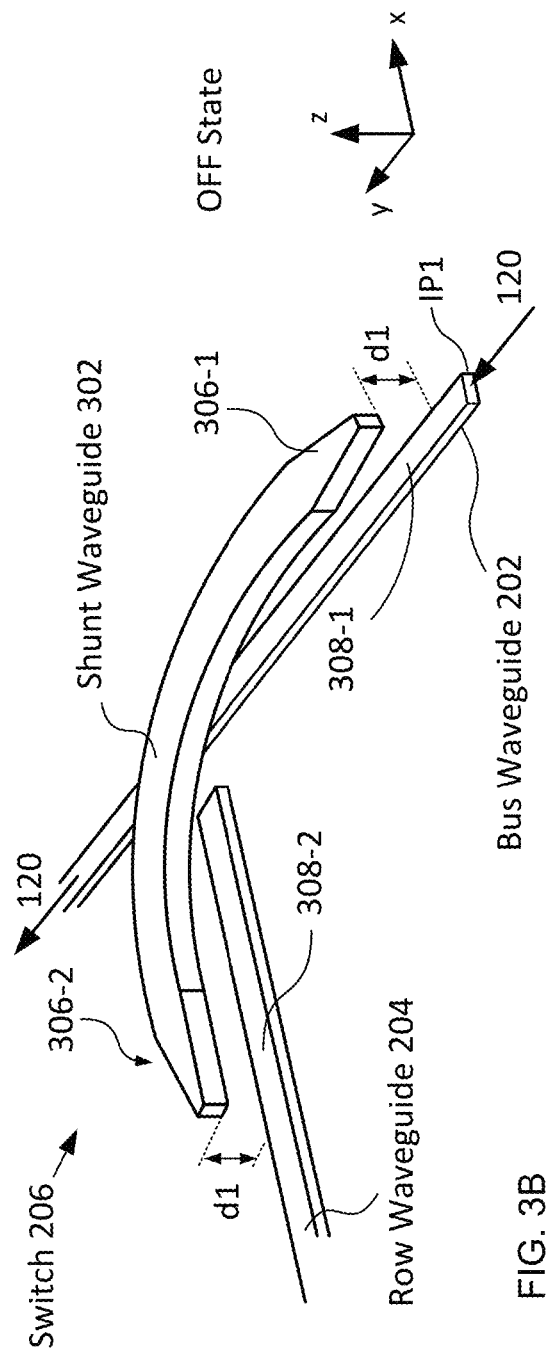
FIGS. 3B-C depict schematic drawings of perspective views of a representative MEMS optical switch 206 in its "off" and ON states, respectively.
Figure 3C:
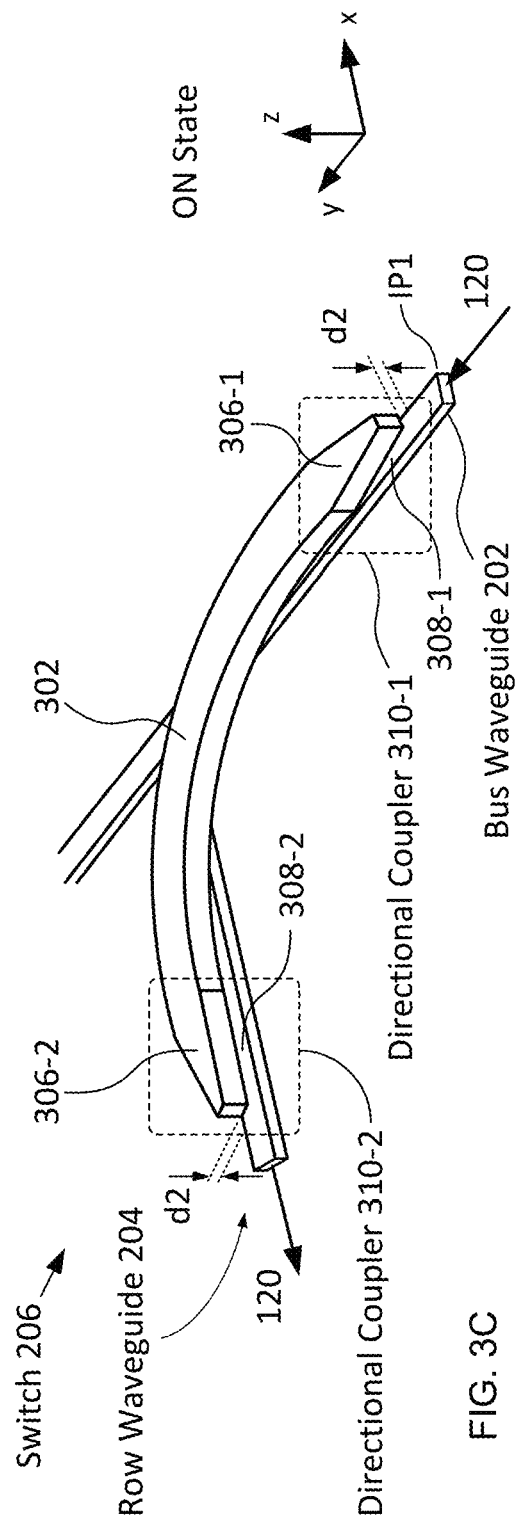

FIGS. 3B-C depict schematic drawings of perspective views of a representative MEMS optical switch 206 in its "off" and ON states, respectively.

MEMS optical switch 206 includes a portion of bus waveguide 202, a portion of row waveguide 204, shunt waveguide 302 and MEMS actuator 304 (not shown in FIGS. 3B-C).

In the depicted example, the portions of bus waveguide 202 and row waveguide 204 are arranged such that there is no waveguide crossing between them. As a result, very low optical insertion loss can be achieved, as well as substantially zero optical cross-talk between the waveguides. In some embodiments, however, the two waveguide portions intersect at a crossing point, preferably such that they are orthogonal to mitigate leakage of bus waveguide 202 into row waveguide 204 when MEMS optical switch 206 is in its OFF state. In some embodiments, bus waveguide 202 includes multi-mode interference (MMI) region and tapers leading into and out of the MMI region. In some embodiments, bus waveguide 202 and row waveguides 204 are formed in different planes above their common substrate.

Shunt waveguide 302 is a waveguide portion that extends between ends 306-1 and 306-2. Shunt waveguide 302 is analogous to bus waveguide 202 and row waveguides 204; however, shunt waveguide 302 is configured to be movable relative to the bus and row waveguides.

Ends 306-1 and 306-2 (referred to, collectively, as ends 306) are aligned directly above waveguide portions 308-1 and 308-2, respectively, where waveguide portions 308-1 and 308-2 (referred to, collectively, as waveguide portions 308) are portions of bus waveguide 202 and row waveguide 204, respectively.

Although not depicted in FIGS. 3A-C for clarity, typically, shunt waveguide 302 also includes projections that extend from its bottom surface to establish a precise vertical spacing between ends 308 and waveguide portions 308 when MEMS optical switch 206 is in its ON state.

MEMS actuator 304 is an electrostatic MEMS vertical actuator that is operative for controlling the vertical position of shunt waveguide 302 and ends 306 relative to waveguide portions 308-1 and 308-2. MEMS actuator 304 is described in more detail below and with respect to FIGS. 4A-C.

Although MEMS optical switch 206 includes an electrostatic MEMS vertical actuator in the illustrative embodiment, it will be clear to one skilled in the art, after reading this Specification, how to specify, make, and use any actuator suitable for controlling the separation between ends 306 and waveguide portions 308. Actuators suitable for use in the present invention include, without limitation, vertical actuators, lateral actuators, and actuators that actuate both vertically and laterally. Further, actuators in accordance with the present invention include, without limitation, electro-thermal, thermal, magnetic, electromagnetic, electrostatic comb-drive, magnetostrictive, piezoelectric, fluidic, pneumatic actuators, and the like.

When MEMS optical switch 206 is in its unswitched (i.e., "off") state, shunt waveguide 302 is held at a first position in which ends 306-1 and 306-2 are separated from waveguide portions 308-1 and 308-2 by distance d1. Distance d1 has a magnitude that is sufficient to ensure that substantially no optical energy transfers between ends 306 and their respective waveguide portions. As a result, light signal 120 bypasses MEMS optical switch 206 and continues to propagate, substantially unperturbed, through bus waveguide 202.

When MEMS optical switch 206 is in its switched (i.e., "on") state, shunt waveguide 302 is moved to a second position in which ends 306 are separated from waveguide portions 308 by distance d2, thereby defining directional couplers 310-1 and 310-2. Distance d2 is determined by the height of the projections on the bottom of the shunt waveguide and has a magnitude that enables the optical energy of light signal 120 to substantially completely transfer from waveguide portion 308-1 into end 306-1 at directional coupler 310-1 and from end 306-2 into waveguide portion 308-2 at directional coupler 310-2. As a result, light signal 120 is substantially completely switched from bus waveguide 202 into row waveguide 204.

It should be noted that MEMS optical switch 206 is merely one example of an integrated-optics-based MEMS optical switch. Additional examples of MEMS switches suitable for use in accordance with the teachings of the present disclosure are described by T. J. Seok, et al., in "Large-scale broadband digital silicon photonic switches with vertical adiabatic couplers," *Optica*, vol. 3, no. 1, p. 64, January 2016, as well as in U.S. Patent Publication No. 20160327751 and International Publication No. WO2018/049345, each of which are incorporated herein by reference. MEMS switches such those described in these publications offer many advantages for programmable coupler arrays in accordance with the present disclosure relative to prior-art beam-steering systems. In particular, such switches have significant lower optical loss than conventional electro-optic or thermo-optic switches, their optical crosstalk (<−60 dB) and power consumption (~10 microwatts) are several orders of magnitude lower than conventional switches, and they can operate in digital mode. These advantages enable beam-steering devices having relatively higher throughput (i.e., lower optical insertion loss) and relatively higher resolution (i.e., greater density of grating couplers) than possible in the prior art, as well as simple digital control.

Returning now to FIG. 2, column switch 118 is a 1×N switch that includes column switch arrays 208-1 through 208-N (referred to, collectively, as column switch arrays 208).

In the depicted example, each column switch array 208 includes M substantially identical MEMS optical switches 210, each of which is analogous to MEMS optical switch 206; however, each MEMS optical switch 210 is configured to control the optical coupling between a respective coupler 112 and a row waveguide 204. Each MEMS optical switch 210 and its associated coupler 112 collectively defines a MEMS-controlled vertical coupler 212.

In the depicted example, all of the MEMS optical switches 210 of each column switch array 208 are "ganged together" such that they are all controlled with the same control signal. As a result, each column switch array 208 simultaneously controls the optical coupling between all M couplers 112 in its respective column of coupler arrays 104 and their respective row waveguides. Such a switch array configuration is particularly advantageous for beam steering system having large numbers of couplers (e.g., an M×N array where each of M and N is 1000 or more), which would require M×N control signals if each coupler were addressed individually. For large systems, the number of electrical input/output (I/O) would quickly exceed standard electrical packaging limits. The use of switch arrays, such as column switch arrays 208, however, can significantly reduce the number of electrical control signals required by enabling a "row-column" addressing scheme that reduces the number of control signals from M×N to M+N.

In the ON state of each MEMS-controlled vertical coupler 212, its MEMS optical switch 210 optically couples its respective row waveguide 204 with its respective coupler 112. As a result, when light signal 120 is propagating through that row waveguide, its optical energy is diverted to its coupler 112. In the OFF state of each MEMS-controlled vertical coupler 212, its MEMS optical switch 210 does not optically couple its respective row waveguide and coupler; therefore, light signal 120 remains in the row waveguide and bypasses that coupler.

FIG. 4A depicts a schematic drawing of a top view of an exemplary MEMS-controlled vertical coupler in accordance with the illustrative embodiment. MEMS-controlled vertical coupler 212 comprises MEMS optical switch 210 and coupler 112.

FIGS. 4B-C depict schematic drawings of a sectional view of MEMS-controlled vertical coupler 212 in its "off" and ON states, respectively. The sectional views shown in FIGS. 4B-C are taken through line a-a depicted in FIG. 4A.

MEMS optical switch 210 includes a portion of coupler waveguide 402, which is operatively coupled with MEMS actuator 404.

Coupler waveguide 402 is analogous to shunt waveguide 302 and is configured to convey light from movable end 406-1 to fixed end 406-2, where vertical-coupling element 408 is located, thereby defining coupler 112. In the depicted example, vertical-coupling element 408 is a diffraction grating that is configured to direct its optical energy toward the center of lens 102 when optical axis A1 is aligned with center point CP1. In some embodiments, at least one of vertical-coupling element 408 includes a different optical element suitable for providing a desired output light signal 120'. Optical elements suitable for use in vertical-coupling element 408 includes, without limitation, prisms, holograms, two-dimensional grating structures, diffractive lenses, diffraction-grating elements, refractive lenses, angle-etched waveguide-facet mirrors, angle-etched waveguides, angled mirrors, and the like.

At movable end 406-1, coupler waveguide 402 is attached to MEMS actuator 404.

At fixed end 406-2, coupler waveguide 402 is physically attached to a pair of anchors 410, which are rigid elements that project up from underlying substrate 114. Since the coupler waveguide is affixed to rigid structural elements in this region, its height above the row waveguide 204 is fixed.

MEMS actuator 404 is analogous to MEMS actuator 304, described above, and includes struts 412, electrodes 414, and tethers 416, which are connected to another pair of anchors 410.

Struts 412 are substantially rigid elements that connect movable end 406-1 to each of electrodes 414.

Electrodes 414 are located above a matching pair of electrodes disposed on substrate 114 (not shown) such that a voltage applied between the two pairs of electrodes give rise to an electrostatic force that pulls the electrodes, struts, and movable end toward the substrate, thereby reducing the separation between coupler waveguide 402 and row waveguide 204.

Tethers 416 are "spring-like" elements that are flexible in the z-direction but substantially rigid along the x- and y-directions. The flexibility of tethers 416 enable the motion of movable end 406-1 relative to row waveguide 204.

When MEMS actuator 404 is in its unactuated state, movable end 406-1 is separated from row waveguide 204 by distance d1. As a result, the two waveguides are not optically coupled, as discussed above and coupler 112 is in its OFF state.

When MEMS actuator 404 is in its actuated state, movable end 406-1 is forced downward such that it becomes separated from row waveguide 204 by distance d2, which is determined by the height of projections 418. As a result, the two waveguides collectively define directional coupler 420, which enables substantially all of light signal 120 to evanescently couple into coupler waveguide 402 and propagate to grating element 408. The optical energy of the light signal is then launched into free-space by grating element 408 and coupler 112 is in its ON state.

It should be noted that the MEMS-controlled vertical coupler 212 is merely exemplary and that myriad alternative designs for MEMS-controlled vertical coupler 212 are within the scope of the present disclosure.

For example, in some embodiments, no coupler waveguide is included in MEMS-controlled vertical coupler 212 and grating element is disposed on a MEMS actuator 404 itself.

FIG. 4D depicts a schematic drawing of a top view of an alternative embodiment of a MEMS-controlled vertical coupler in accordance with the present disclosure. MEMS-controlled vertical coupler 212A includes MEMS actuator 404, grating element 408, platform 422, and coupler waveguide 424.

Platform 422 is a substantially rigid structural element formed at the center of the MEMS actuator. Platform 422 includes coupler waveguide 424, which is analogous to the movable portion of coupler waveguide 402.

FIGS. 4E-F depict schematic drawings of MEMS-controlled vertical coupler 212A in its OFF and ON states, respectively. The sectional views shown in FIGS. 4E-F are taken through line b-b depicted in FIG. 4D.

When MEMS actuator 404 is in its unactuated state, movable end 406-1 is separated from row waveguide 204 by distance d1. As a result, the two waveguides are not optically coupled and coupler 112 is in its OFF state.

When MEMS actuator 404 is in its actuated state, row waveguide 204 and coupler waveguide 424 collectively define directional coupler 426, which couples optical energy from the row waveguide directly into grating element 408, which then emits the energy into free space.

In some embodiments, MEMS-controlled vertical coupler 212 includes a row waveguide and coupling waveguide that lie in the same plane and switching is realized using a movable shunt waveguide, as described above.

Figure 4G:
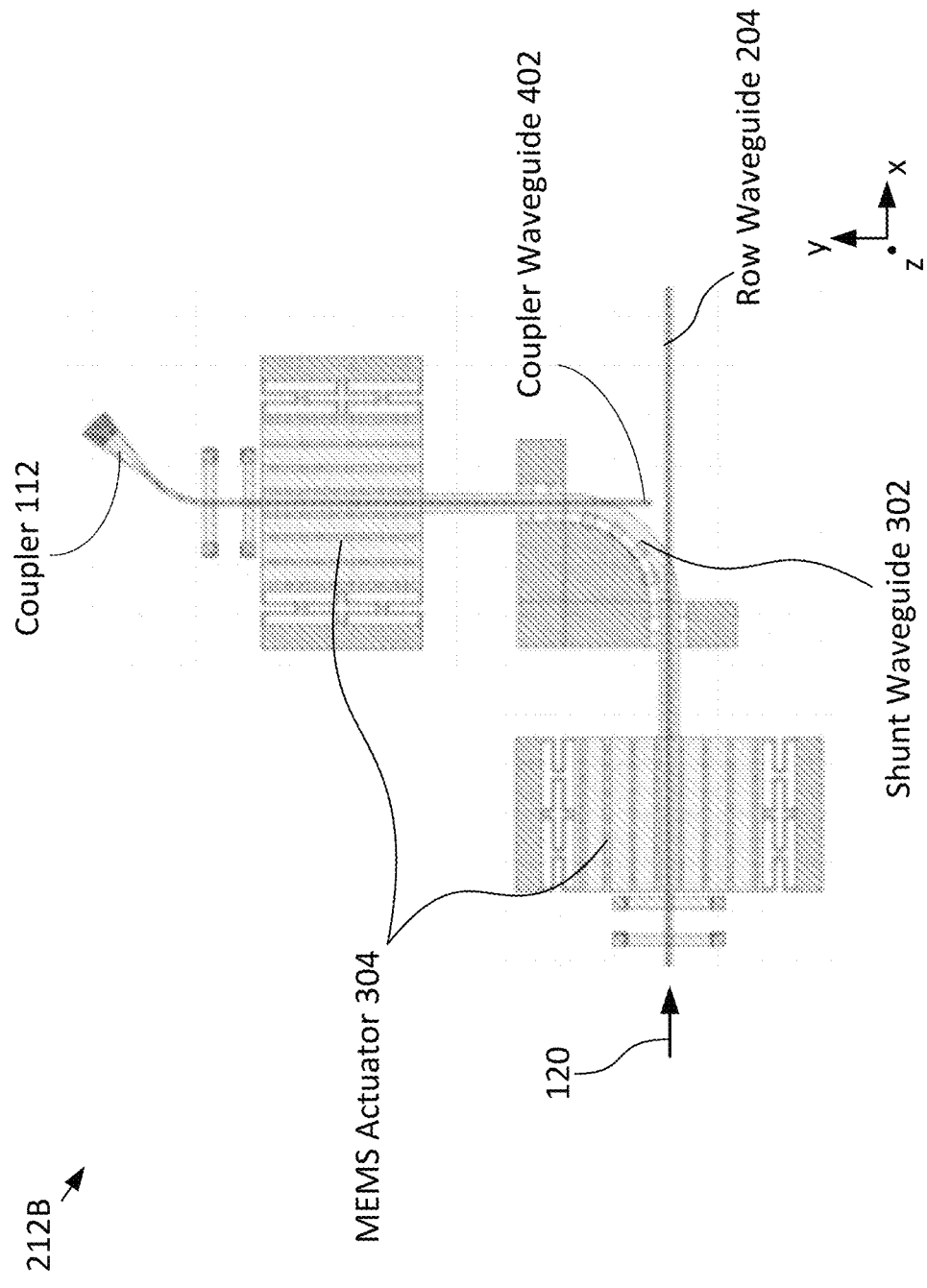
FIG. 4G depicts a schematic drawing of MEMS-controlled vertical coupler 212B.

FIG. 4G depicts a schematic drawing of a top view of another alternative MEMS-controlled vertical coupler in accordance with the present disclosure. MEMS-controlled vertical coupler 212B includes MEMS actuator 304, row waveguide 204, coupler waveguide 424, shunt waveguide 302, and coupler 112. MEMS-controlled vertical coupler 212B is analogous to MEMS optical switch 206 described above and with respect to FIGS. 3A-C.

When MEMS actuator 304 is in its unactuated state, shunt waveguide is held well above row waveguide 204 and coupler waveguide 424. As a result, the two waveguides are not optically coupled and coupler 112 is in not energized.

When MEMS actuator 304 is in its actuated state, shunt waveguide 302 is optically coupled with each of row waveguide 204 and coupler waveguide 424, thereby defining directional couplers at each end of the shunt waveguide. As a result, optical energy couples from the row waveguide into the shunt waveguide and then from the shunt waveguide into the coupling waveguide. The optical energy is conveyed by the coupling waveguide into coupler 112, thereby energizing it such that it emits the optical energy into free space.

Figure 5:
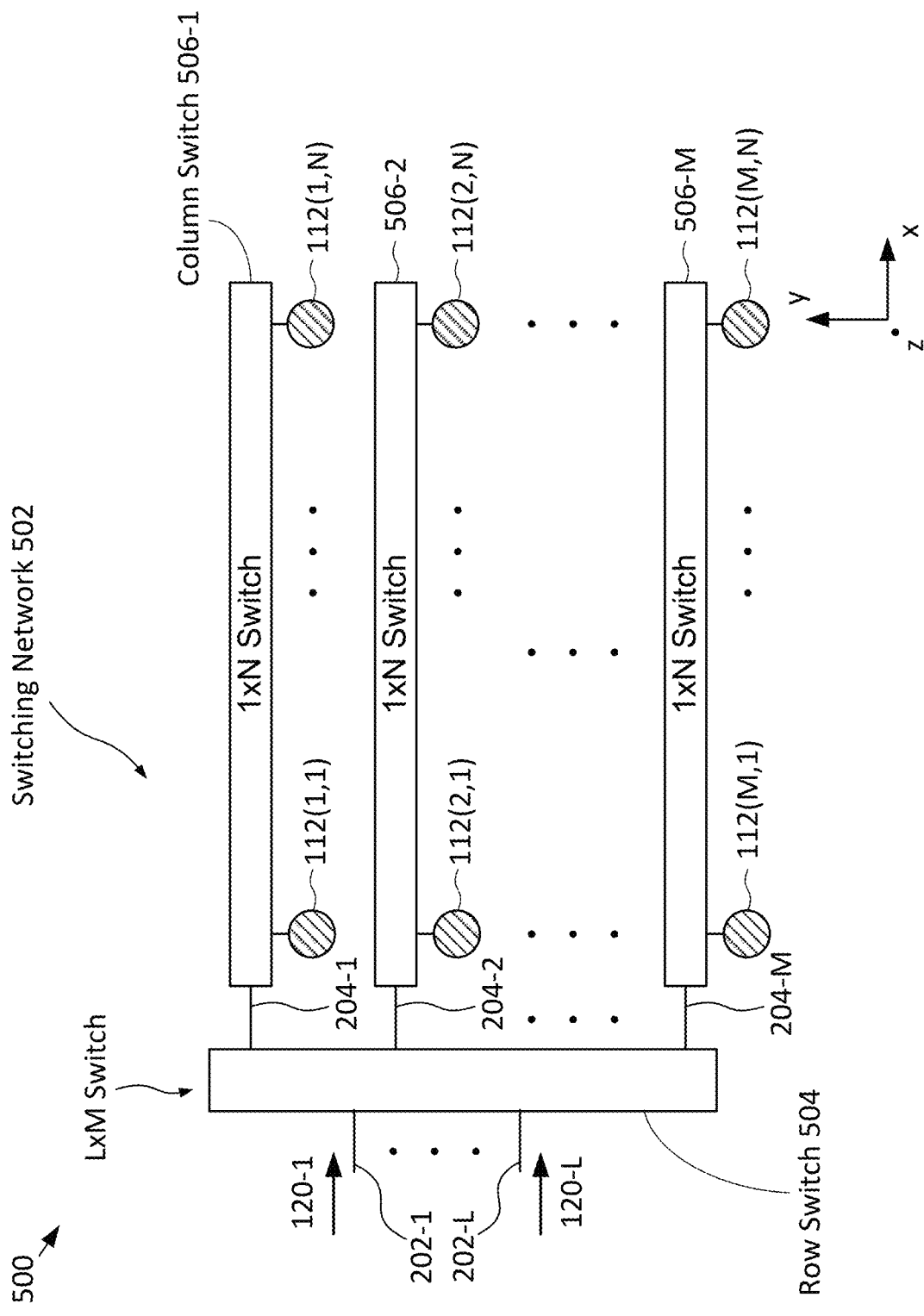
FIG. 5 depicts an alternative programmable coupler array in accordance with the present disclosure.

FIG. 5 depicts an alternative programmable coupler array in accordance with the present disclosure. Coupler array 500 is analogous to coupler array 104; however, coupler array 500 is configured to direct multiple light signal to multiple couplers 112, thereby enabling beam-steering systems that can simultaneously form and steer multiple output beams.

Coupler array 500 includes switching network 502 and vertical couplers 112, bus waveguide 202, and row waveguides 204-1 through 204-M.

Switching network 502 includes row switch 504 and column switches 506-1 through 506-M.

Row switch 504 is an L×M switch that is operative for directing any of input signals 120-1 through 120-L to a different one of row waveguides 204-1 through 204-M.

Each of column switches 506-1 through 506-M is 1×N optical switch that includes N switches 510. Column switch 506-1 directs the light signal it receives from row switch 504 to one of couplers 112(1,1) through 112(1,N), column switch 506-2 directs light signal 120-2 to one of couplers 112(2,1) through 112(2,N), and so on.

As a result, a beam-steering system comprising coupler array 500 can provide a plurality of independently steerable collimated output beams 110-1 through 110-L.

As noted above, the number of electrical signals required can become problematic for a beam system having independently controllable switches. For example, in system 500, the number of electrical signals required is N×M+L×M. In some embodiments, however, integrated electrical addressing circuits are included to mitigate electrical packaging problems. Such integration can be achieved via any of a wide range of known techniques, such as monolithic integration, hybrid integration, flip-chip bonding, and the like.

It should be noted that the architecture of system 500 is blocking in the sense that only one coupler 112 per row can receive a light signal from row switch 504.

Figure 6:
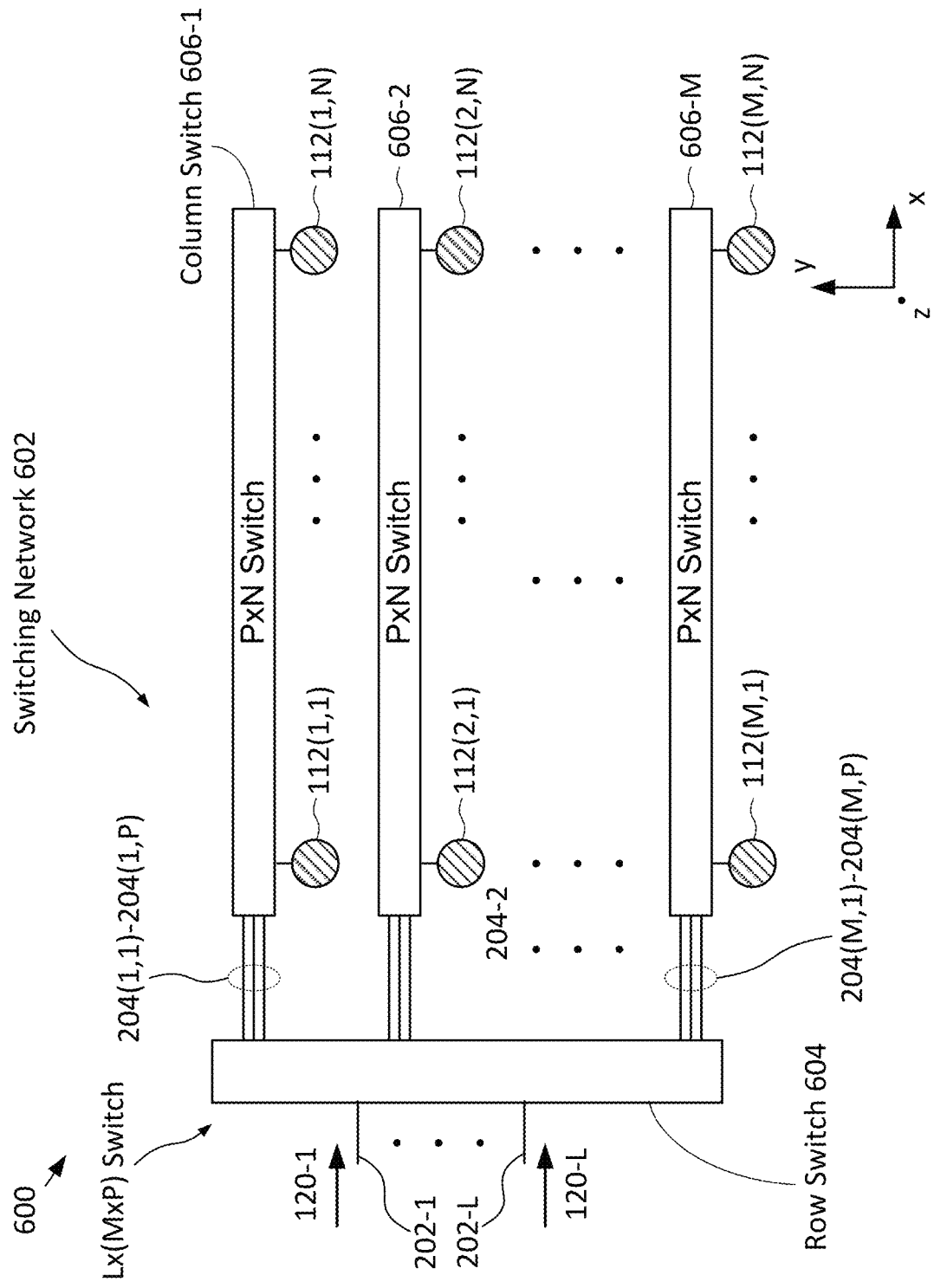
FIG. 6 depicts another alternative programmable coupler array in accordance with the present disclosure.

FIG. 6 depicts another alternative programmable coupler array in accordance with the present disclosure. Programmable coupler array 600 is a non-blocking coupler array suitable for use in a beam-steering system configured to provide a plurality of independently steerable output beams. Programmable coupler array 600 is analogous to programmable coupler array 500; however, switching network 602 includes a row switch that is an L×M optical switch and M column switches that are P×N optical switches.

Coupler array 600 includes switching network 602, vertical couplers 112, bus waveguide 202, and row waveguides 204-1 through 204-M×P.

Switching network 602 includes row switch 604 and column switches 606-1 through 606-M.

Row switch 604 is an L×(M×P) switch that is operative for directing any of input signals 120-1 through 120-L to a different one of bus waveguides 204-1 through 204-M×P.

Each of column switches 506-1 through 506-M is P×N optical switch capable of directing a light signal received on each of P row waveguides 204 to any of N coupler 112. Column switch 606-1 directs the light signal it receives on each of row waveguides 204(1,1) through 204(1,P) to any one of couplers 112(1,1) through 112(1,N), column switch 506-2 directs the light signal it receives on each of row waveguides 204(2,1) through 204(2,P) to one of couplers 112(2,1) through 112(2,N), and so on.

In other words, each row of couplers 112 is connected to L×(M×P) switch 604 through P waveguides and a P×N switch 606. As a result, any of P input signals can simultaneously access the grating couplers in the same row.

Figure 7:
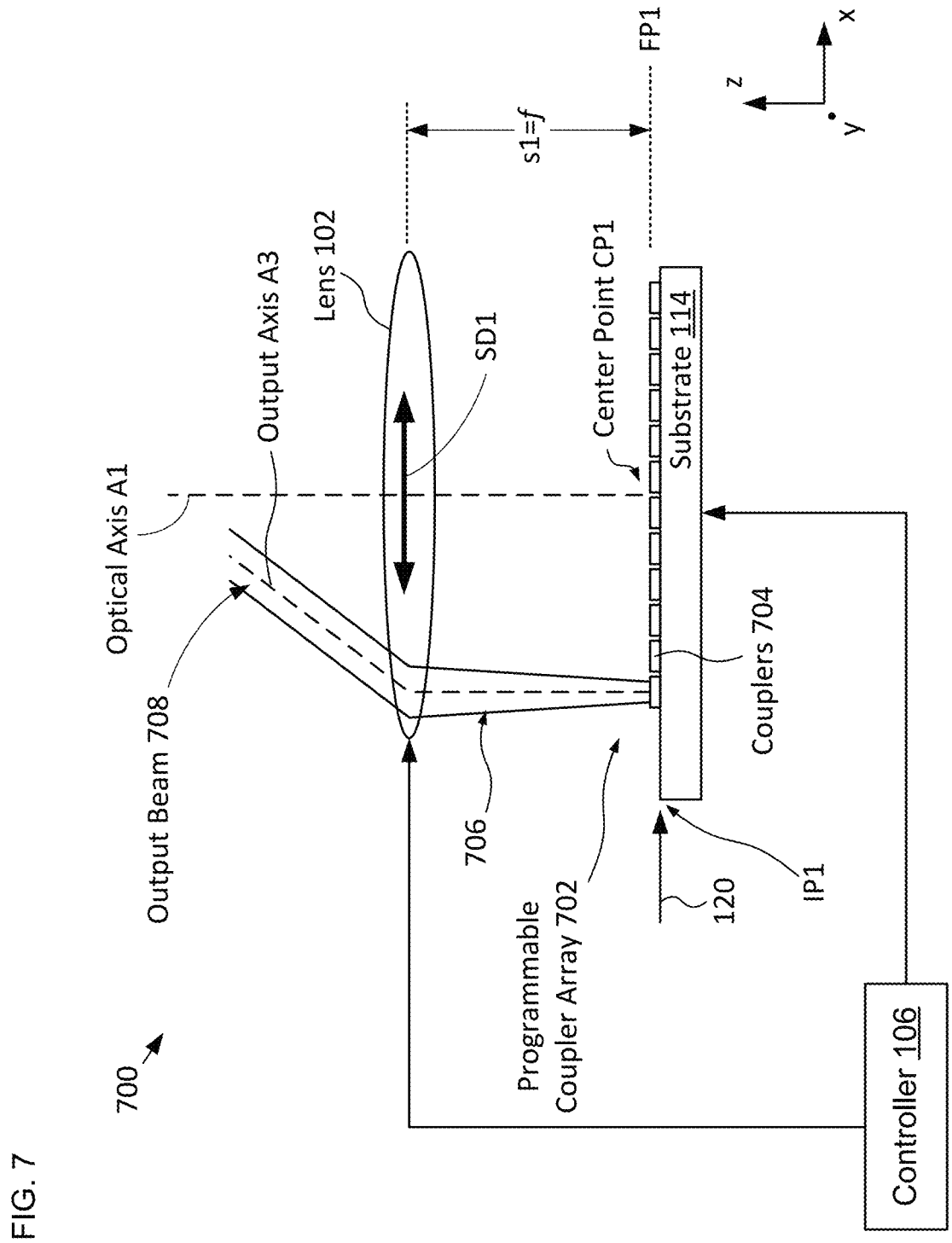
FIG. 7 depicts a schematic drawing of a side view of an alternative beam-steering system in accordance with the present disclosure.

FIG. 7 depicts a schematic drawing of a side view of an alternative beam-steering system in accordance with the present disclosure. Beam-steering system 700 is analogous to beam steering system 100; however, beam-steering system 700 includes coupler array 702, which includes couplers that are conventional vertical-grating couplers.

Coupler array 702 includes switching network 110 and vertical couplers 704(1,1) through 704(M,N) (referred to, collectively, as couplers 704).

Couplers 704 are analogous to couplers 112; however, in the depicted example, couplers 704 are conventional vertical-grating couplers configured to provide direct their free-space emission (i.e., light signal 706) as a relatively small-divergence light signal that propagates along a propagation direction that is substantially normal to focal plane FP1. As a result, light signal 706 interacts with only a relatively small portion of the clear aperture of lens 102.

Lens 102 receives light signal 706 and collimates it as output beam 708 and diverts the output beam such that it propagates along output axis A3. As discussed above and with respect to FIGS. 1A-D, the angle of output axis A3, relative to optical axis A1, depends on the position of coupler 704(i,j) within coupler array 702.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A beam-steering system comprising:
   a lens; and
   a programmable vertical coupler array comprising:
      a substrate;
      an array of couplers having a plurality of coupler rows and a plurality of coupler columns, each coupler of the array including a coupler waveguide having a movable end and a fixed end that includes a vertical-coupling element that is immovable relative to the substrate, the vertical-coupling element being configured to launch optical energy received from the coupler waveguide into free space;
      a bus waveguide disposed on the substrate, the bus waveguide having a first input port configured to receive a first light signal;
      a first plurality of row waveguides disposed on the substrate; and
      a switching network that is operative for controlling the propagation of the first light signal from the first input port to any coupler of the array;
   wherein the lens and programmable vertical coupler array are arranged such that the lens receives the optical energy launched by each vertical-coupling element and directs the optical energy in a direction that is based on the position of that vertical-coupling element within the programmable vertical coupler array and a relative position of the lens and the programmable vertical coupler array.

2. The system of claim 1 wherein the switching network includes:
   a row switch that includes a plurality of input ports for receiving a plurality of light signals from the bus waveguide, and wherein the row switch is operative for directing each light signal of the plurality thereof to any of the first plurality of row waveguides; and
   a plurality of column switches, each column switch being operatively coupled with a different row waveguide and a different coupler row, wherein each column switch is configured to enable optical coupling between its respective row waveguide and any coupler of its respective coupler row.

3. The system of claim 1 wherein each of the first plurality of row waveguides comprises a second plurality of row waveguides, and wherein the switching network includes:
   a row switch that includes a plurality of input ports for receiving a plurality of light signals from the bus waveguide, and wherein the row switch is operative for directing each light signal of the plurality thereof to any of the first plurality of row waveguides; and
   a plurality of column switches, each column switch being operatively coupled with the row switch by the second plurality of row waveguides, wherein each column switch is configured to enable optical coupling between each of its respective second plurality of row waveguides and any coupler of its respective coupler row.

4. The system of claim 3, wherein the switching network is non-blocking thereby enabling any coupler to receive one of the plurality of light signals regardless of whether any other coupler is receiving one of the plurality of light signals.

5. The system of claim 1 wherein the lens is selected from the group consisting of a single lens, a compound lens; a telecentric lens; a telescope; and a cellphone lens.

6. The system of claim 1 wherein at least one coupler of the array is configured to at least partially correct an aberration of the lens.

7. The system of claim 1 wherein the switching network includes:
   a row switch that includes the first input port and a first plurality of MEMS optical switches, each MEMS optical switch being operatively coupled with the bus waveguide and a different row waveguide and having (1) a first state in which the bus waveguide is optically decoupled from its respective row waveguide and (2) a second state in which the bus waveguide and its respective row waveguide are optically coupled; and
   a column switch that includes a plurality of column switch arrays, wherein each column switch array includes a second plurality of MEMS optical switches, each MEMS optical switch being operatively coupled with a different row waveguide and a different coupler of its respective coupler column and having (1) a first state in which its respective row waveguide is optically decoupled from its respective coupler and (2) a second state in which its respective row waveguide and its respective coupler are optically coupled.

8. The system of claim 7 wherein the second plurality of MEMS optical switches of at least one column switch array are configured such that they are all controlled with the same control signal.

9. The system of claim 7 wherein each MEMS optical switch of the first plurality thereof includes:
   a shunt waveguide that is movable relative to the substrate and having a first end and a second end; and
   a MEMS actuator that is configured to move the shunt waveguide between (1) a first position in which the bus waveguide is optically decoupled from its respective row waveguide and (2) a second position in which the bus waveguide is optically coupled with its respective row waveguide;
   wherein, when the MEMS actuator is in the second position:
      the first end and a first waveguide portion of the bus waveguide collectively define a first directional coupler that enables optical energy to couple from the bus waveguide into the shunt waveguide; and
      the second end and a second waveguide portion of its respective row waveguide collectively define a second directional coupler that enables optical energy to couple from the shunt waveguide into its respective row waveguide.

10. The method of claim 9, wherein the first directional coupler comprises an adiabatic coupler.

11. The system of claim 7 wherein each MEMS optical switch of the second plurality thereof includes:
a MEMS actuator that is configured to move the movable end between (1) a first position in which the coupler waveguide is optically decoupled from its respective row waveguide and (2) a second position in which the coupler waveguide is optically coupled with its respective row waveguide;
wherein, when the MEMS actuator is in the second position, the movable end and its respective row waveguide collectively define a directional coupler that enables optical energy to couple from its respective row waveguide into the coupler waveguide.

12. The system of claim 7 wherein each MEMS optical switch of the second plurality thereof includes:
the coupler waveguide of its respective coupler, the coupler waveguide including the vertical-coupling element; and
a MEMS actuator that is configured to move the coupler waveguide between (1) a first position in which the coupler waveguide is optically decoupled from the respective row waveguide and (2) a second position in which the coupler waveguide is optically coupled with the respective row waveguide;
wherein, when the MEMS actuator is in the second position, the coupler waveguide and the respective row waveguide collectively define a directional coupler that enables optical energy to couple from the respective row waveguide into the vertical-coupling element.

13. The system of claim 1 further comprising a controller that is operative for controlling the relative position of the lens and the programmable vertical coupler array.

14. The method of claim 13, wherein the controller is operative to move the lens in a first lateral direction relative to the programmable vertical coupler array to direct the optical energy between angles dictated by fixed positions of each vertical-coupling element within the array.

15. The system of claim 1 wherein at least one vertical-coupling element of the plurality thereof comprises an optical element selected from the group consisting of a diffraction grating, a prism, a hologram, a two-dimensional grating structure, a diffractive lens, a blazed-grating element, a refractive lens, an angle-etched waveguide-facet mirror, an angle-etched waveguide, and an angled mirror.

16. The system of claim 1, further comprising a LiDAR system monolithically integrated with the semiconductor beam-steering device.

17. The system of claim 1, wherein portions of the bus waveguide and plurality of row waveguides are arranged such that there is no waveguide crossing between them.

18. A method for steering an optical beam, the method comprising:
receiving a light signal with an input of a bus waveguide of a beam-steering device, the bus waveguide being disposed on a substrate;
controlling a MEMS switching network of the beam-steering device to direct propagation of the light signal from the input to at least one coupler of a coupler array of the beam-steering device, each coupler of the coupler array including a coupler waveguide having a movable end and a fixed end that includes a vertical-coupling element that is immovable with respect to the substrate, the vertical-coupling element being configured to launch optical energy received from the coupler waveguide into free space;
optically coupling the at least one coupler to the light signal to launch optical energy from the at least one coupler into free space; and
arranging a lens of the beam-steering device to direct the optical energy as an output beam.

19. The method of claim 18 wherein controlling the MEMS switching network further comprises:
controlling a first MEMS optical switch of the beam-steering device to couple the light signal into a first row waveguide of the beam-steering device; and
controlling a second MEMS optical switch of the beam-steering device to couple the light signal from the first row waveguide to the at least one coupler.

20. The method of claim 19 wherein controlling the first MEMS optical switch further comprises:
moving a shunt waveguide of the first MEMS optical switch with a MEMS actuator between (1) a first position in which the bus waveguide is optically decoupled from the first row waveguide and (2) a second position in which the bus waveguide is optically coupled with the first row waveguide.

21. The method of claim 19 wherein controlling the MEMS switching network further comprises controlling a plurality of MEMS optical switches in a first column switch array of the beam-steering device with a first control signal to couple the light signal into at least one row waveguide of the of the beam-steering device.

22. The method of claim 19 wherein controlling the second MEMS optical switch further comprises:
moving the movable end of the at least one coupler with a MEMS actuator between (1) a first position in which the at least one coupler is optically decoupled from the first row waveguide and (2) a second position in which the at least one coupler is optically coupled with the first row waveguide.

23. The method of claim 22, wherein, when the MEMS actuator is in the second position, the movable end and the first row waveguide collectively define a directional coupler that enables optical energy to couple from the first row waveguide into the at least one coupler.

24. The method of claim 19, wherein, when the MEMS actuator is in the second position, the shunt waveguide and the bus waveguide collectively define a first directional coupler that enables optical energy to couple from the bus waveguide into the shunt waveguide; and
the shunt waveguide and the first row waveguide collectively define a second directional coupler that enables optical energy to couple from the shunt waveguide into the first row waveguide.

25. The method of claim 18 wherein the light signal comprises a plurality of light signals, and wherein controlling the MEMS switching network further comprises:
receiving the plurality of light signals with a plurality of input ports of a row switch of the beam-steering device;
directing the plurality of light signals into any of a plurality of row waveguides with a row switch of the beam-steering device; and
optically coupling any of the at least one coupler of the coupler array with its respective row waveguide with at least one of a plurality of column switches of the beam-steering device.

26. The method of claim 25 further comprising controlling the MEMS switching network to be non-blocking such that any of the at least one coupler of the coupler array can receive the light signal regardless of whether any other of at least one coupler of the coupler array is receiving the light signal.

27. The method of claim 18 wherein the lens is selected from the group consisting of a single lens, a compound lens; a telecentric lens; a telescope; and a cellphone lens.

28. The method of claim 18 further comprising correcting an aberration of the lens at the at least one coupler of the coupler array.

29. The method of claim 18 wherein arranging the lens further comprises controlling a relative position of the lens with respect to the coupler array.

30. The method of claim 18, further comprising using the output beam in a LiDAR system for light detection and ranging.

* * * * *